United States Patent [19]

Lennon, Jr.

[11] Patent Number: 5,078,399
[45] Date of Patent: Jan. 7, 1992

[54] SYSTEM FOR CONVERTING A HOME VIDEO GAME TO A COIN-OPERATED VIDEO GAME

[76] Inventor: John R. Lennon, Jr., 126 Center Ave., Jim Thorpe, Pa. 18229

[21] Appl. No.: 528,249

[22] Filed: May 24, 1990

[51] Int. Cl.⁵ .............................................. A63F 9/22
[52] U.S. Cl. .................................. 273/148 B; 273/434
[58] Field of Search ............... 194/241, 242, 230, 231, 194/219; 273/85 G, 1 E, 148 B, DIG. 28, 434; 364/410

[56] References Cited

U.S. PATENT DOCUMENTS

| | | | |
|---|---|---|---|
| 3,337,218 | 8/1967 | Hurley | 273/85 |
| 4,053,740 | 10/1977 | Rosenthal | 273/85 G |
| 4,089,524 | 5/1978 | Hauck | 273/85 G |
| 4,418,398 | 11/1983 | Hornung | 364/900 |
| 4,566,033 | 1/1986 | Reidenouer | 194/241 |
| 4,586,179 | 4/1986 | Sirazi et al. | 371/12 |
| 4,593,376 | 6/1986 | Volk | 364/900 |
| 4,652,998 | 3/1987 | Koza et al. | 273/138 A |
| 4,821,862 | 4/1989 | Nelson | 194/241 |
| 4,858,930 | 8/1989 | Sato | 273/85 |
| 4,865,321 | 9/1989 | Nakagawa et al. | 273/85 |
| 4,871,176 | 10/1989 | Knetzger | 273/237 |
| 4,922,420 | 5/1990 | Nakagawa et al. | 364/410 |
| 4,958,835 | 9/1990 | Tashiro et al. | 364/410 |

Primary Examiner—Edward M. Coven
Assistant Examiner—Jessica J. Harrison
Attorney, Agent, or Firm—Perman & Green

[57] ABSTRACT

A conversion system is described for adapting a home-play electronic game to coin-operated play. The electronic game has at least one access port for communicating with a remote controller, the access port including DC level connections and a plurality of signal line connections. The game exhibits both Attract and Play modes, the Attract mode being operative when power is first applied to the game, but not when the Play mode is in progress. The conversion system comprises a replacement user control panel that includes a start indicator and game control signalling devices. A power supply and coin receipt indicator are also provided. A timer is responsive to a coin deposit to enable the operation of the start indicator for a predetermined time interval. A register is provided which is connected to the signal line ports of the game and provides thereto, signals from both the start indicator and game signalling devices. A player use timer is responsive to a player actuating at least one of the game control signalling devices to provide a determined time-use output. A reset circuit is responsive to the termination of the determined time-use output to interrupt power to the game to cause initiation of the attract mode.

9 Claims, 3 Drawing Sheets

SYSTEM FOR CONVERTING A HOME VIDEO GAME TO A COIN-OPERATED VIDEO GAME

FIELD OF THE INVENTION

This invention relates to video games, and more particularly, to a system which converts a home video game to a coin-operated game without requiring access within the case which encloses the home video game.

BACKGROUND OF THE INVENTION

Both coin and home video games are well-known and have seen wide commercial acceptance. One early example of a coin-operated video game is found in U.S. Pat. No. 3,337,218 to Hurley, which describes a coin-operated horseshoe game. Such games have been widely installed in arcades and public amusement places. However, due to the limited size of the coin-operated market, their prices have been relatively high as compared to similar games available for home use. Today, a video game suitable for arcade use may cost from $3000 to $5000, whereas a similar game intended for home use can be purchased for approximately $100 to $200. A major reason for the price disparity is that home games are manufactured in large quantities and achieve substantial savings as a result.

Others have attempted to convert home-style video games to coin-operation. For instance, in U.S. Pat. No. 4,871,176 to Knetzger, the output from a conventional player is fed through a token-operated activating means. Upon insertion of a token, the output from the player is fed to a monitor where it may either be viewed or listened to. No thought is given by Knetzger to the various control modes which must accommodate a coin-operated game in a public facility. For instance, some means must be provided to disable the game once a player ceases play or the game is over. Furthermore, some means must be provided to reset the game to its initial state once play has terminated. Further, access to the game must be limited to only a control panel specifically designed to withstand the rigors of public use.

In U.S. Pat. No. 4,858,930 to Sato, it is realized that similar games may exist in both home and arcade type systems. Sato suggests that skill levels achieved during home game play be inserted into the arcade game unit to enable a higher level of skilled play therein.

A home video game which has recently achieved commercial success, is one that accepts a game cartridge which stores a prerecorded game in a read only memory. Such games are marketed by the Nintendo Company Ltd. and are described in U.S. Pat. No. 4,865,321 to Nakagawa et al.

Referring to FIG. 1 of the drawings hereof, a block diagram of the video game described by Nakawaga et al. is illustrated. Base unit 10 is provided with a cartridge-receiving opening 12 and a pair of input/output ports 14 and 16. Port 14 provides power and signal communications between base unit 10 and a controller 18. Port 16 provides the same functions for controller 20. Each controller is provided with a control mechanism 22 that provides right, left, up and down signals to base unit 10. Other actuators on controller 18 enable signals to be generated which function as reset, select or game-figure actuation signals (e.g., buttons 26) for base unit 10. Controllers 18 and 20 enable two players to play a game.

Controllers 18 and 20 are connected to base unit 10, via multiconductor cables 34 and 35. Each cable includes a plurality of signal lines which transmit control signals from a controller to base unit 10. Each cable also contains a pair of lines that bring both ground and power connections to the controller.

A power supply 28 connects to an AC supply and provides a nine volt input to base unit 10 which, in turn, contains an internal, regulated dc power supply. The video game, as operated by controller 18 and/or 20, is viewed on a standard TV set or monitor 30 that connects via line 32 to video and audio outputs from base unit 10.

The operation of the prior art unit of FIG. 1 commences when a player inserts a cartridge into slot 12. Assuming the power to base unit 10 has been connected, the game automatically is displayed in the Attract mode. Then, by the player operating an actuator on a controller (18 or 20), the game exits the Attract mode and enters the Play mode where it can be further executed, interactively.

The above-described video game performs all the desired game functions that a coin-operated game performs, and at a much lower cost. Conversion of such a home-style game unit has been heretofore thought impractical because it was believed that access was required to functions within the base unit that are not accessible from the game's exterior ports. To access such functions within the base unit would be both expensive and would tend to reduce the reliability of the unit.

Accordingly, it is an object of this invention to provide means for modifying a home use electronic game to enable it to operate on a coin-operated basis.

It is a further object of this invention to modify a home-use game unit to enable coin controlled operation, without requiring access within a case which encloses the game unit.

SUMMARY OF THE INVENTION

A conversion system is described for adapting a home-play electronic game to coin-operated play. The electronic game has at least one access port for communicating with a remote controller, the access port including DC level connections and a plurality of signal line connections. The game exhibits both Attract and Play modes, the Attract mode being operative when power is first applied to the game, but not when the Play mode is in progress. The conversion system comprises a replacement user control panel that includes a start indicator and game control signalling devices. A power supply and coin receipt indicator are also provided. A timer is responsive to a coin deposit to enable the operation of the start indicator for a predetermined time interval. A register is provided which is connected to the signal line ports of the game and provides thereto, signals from both the start indicator and game signalling devices. A player use timer is responsive to a player actuating at least one of the game control signalling devices to provide a determined time-use output. A reset circuit is responsive to the termination of the determined time-use output to interrupt power to the game to cause initiation of the attract mode.

DETAILED DESCRIPTION OF THE INVENTION

Figure 1:
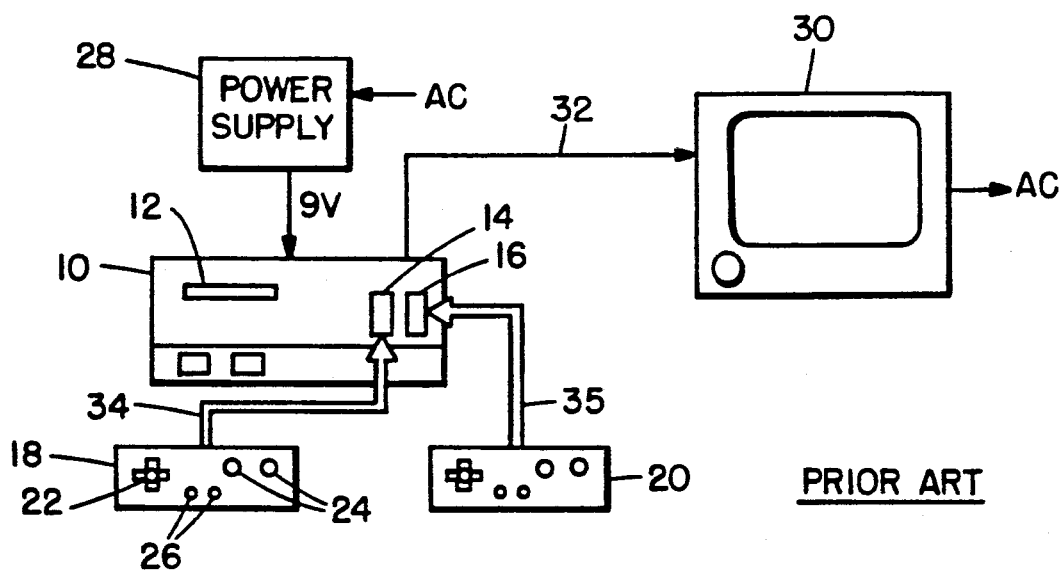
FIG. 1 is a block diagram of a prior art cartridge-operated, video game.
Figure 2:
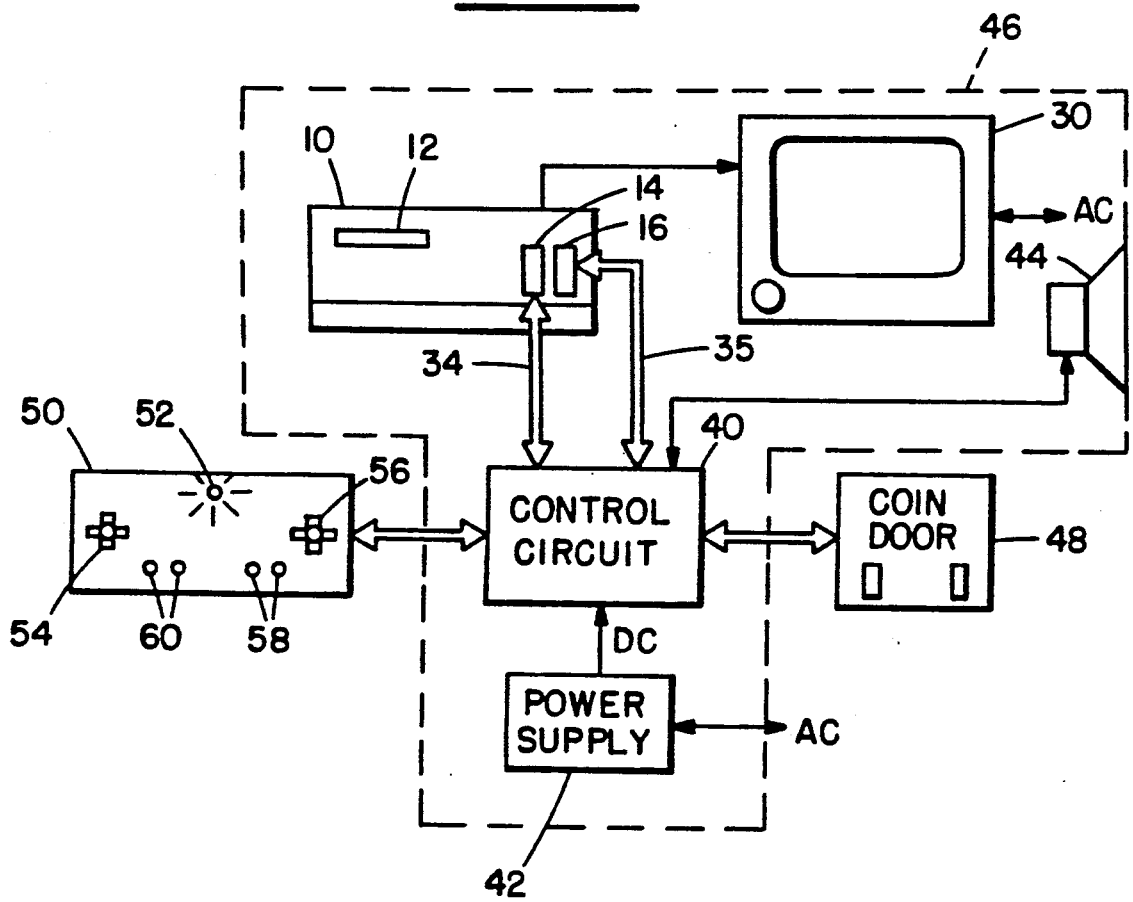
FIG. 2 is a high level block diagram showing modifications to the game of FIG. 1 which, modifications

Referring now to FIG. 2, the prior art game structure shown in FIG. 1 has been modified to include an external control circuit 40, to which cables 34 and 35 now connect. Additionally, in this preferred embodiment, a substitute power supply 42 provides both DC power for control circuit 40 and, via cables 34 and 35, DC power for base unit 10.

In lieu, of using the sound system of monitor 30, a speaker 44 is connected to control circuit 40 and is operated thereby. All of the above-mentioned apparatus is now contained within a single case 46 (shown in phantom). On an external surface of case 46, a coin door 48 has been emplaced and, in addition, a two-player, control panel 50 has been substituted for individual controllers 18 and 20. Control panel 50 includes a start button 52 which is both depressable and contains an internal light to show its state of enablement. Additionally, a pair of X-Y joysticks 54 and 56 provide game operating inputs to control circuit 40 which, in turn, feeds corresponding signals to base unit 10. Other control buttons 58 and 60 provide further actuation functions for characters within a game being played on base unit 10.

Figure 3:
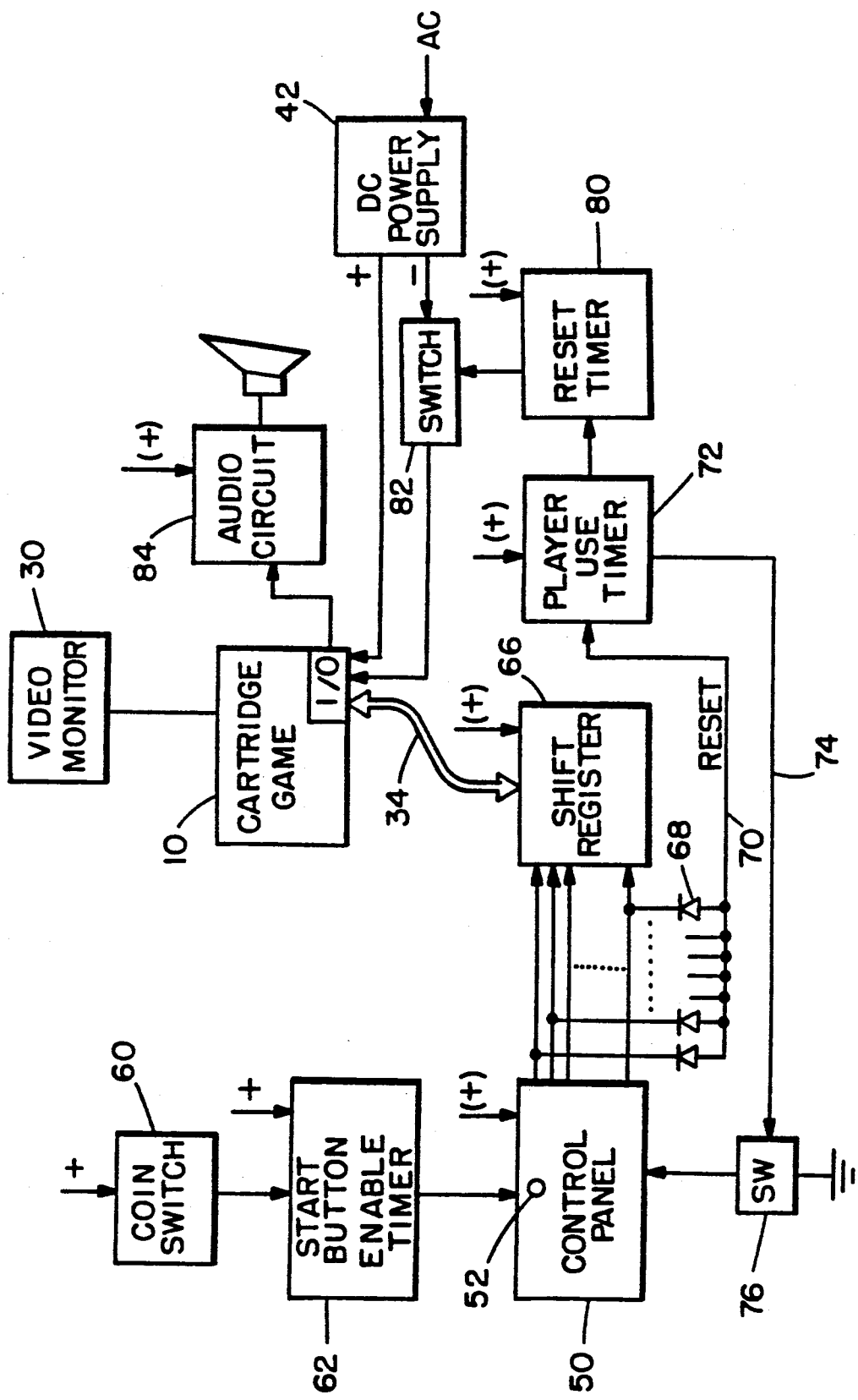
FIG. 3 is a more detailed block diagram showing further details of the invention.

Turning now to FIG. 3, a block diagram is shown which details the major sub-components of control circuit 40 and illustrates their respective interactions with power supply 42 and base unit 10. A coin switch 60 senses the insertion of a coin into coin door 48 (FIG. 2), and provides an indication thereof to start button enable timer 62. Timer 62 provides, for a preset interval, an enabling signal to start button 52 in control panel 50. During that enablement time, a light within start button 52 is illuminated thereby indicating to the user that play of a game may commence.

Assuming that a player depresses start button 52, a signal is applied to one of conductors 64 and thence to shift register 66, where it is combined with signals from one or more additional input lines (if any) and fed via cable 34, to an input/output port on base unit 10. Additionally, when one of lines 64 is signalled by control panel 50, that signal is sensed by one of diodes 68 and is passed, via line 70, to a player use timer 72. In response, player use timer 72 provides an output via line 74 that causes switch 76 to close which, in turn, applies a ground connection to all controls on control panel 50.

At this stage, an input signal has been applied to base unit 10 from start button 52 indicating that a game, currently in the Attract mode, should transfer to the Play mode. In addition, the closure of switch 76 and its application of a ground to all controls on control panel 50 (other than start button 52), enables those controls for user actuation.

As each control is exercised by a player, a signal indicating such action appears on line 64 and is passed by cable 34 to a base unit 10. In addition, that signal is passed by a diode to reset line 70, which, in turn, causes player use timer 62 to commence its time-out anew. That time-out is pre-set so that it alots sufficient time for the player to play the game, but also provides an indication to a reset timer 80 if, for any reason, the player does not actuate a control device within the preset time-out interval. Exemplary time-out intervals are in the range of 40-60 seconds. Thus, so long as player use timer 72 continues receiving reset signals on line 70, switch 76 remains closed and a ground is applied to control panel 50, thereby enabling its operation.

When player use timer 72 times out, a signal is provided to reset timer 80. In response timer 80 resets the game being executed in base unit 10, from the Play mode to the Attract mode. In addition, when player use timer 72 times out, switch 76 is opened to remove ground from the controls on control panel 50, thereby preventing further play of the game.

During the time-out of reset timer 80, an output is provided that causes switch 82 to open the return ground line between DC power supply 42 and base unit 10. Thus, the power to base unit 10 is interrupted, and, in response, it automatically reverts to the Attract mode. Preferably, reset timer 80 has a 10 second or less time-out. An audio circuit 84 is additionally provided to enable independent control of the audio portion of the game emanating from base unit 10.

Figure 4:
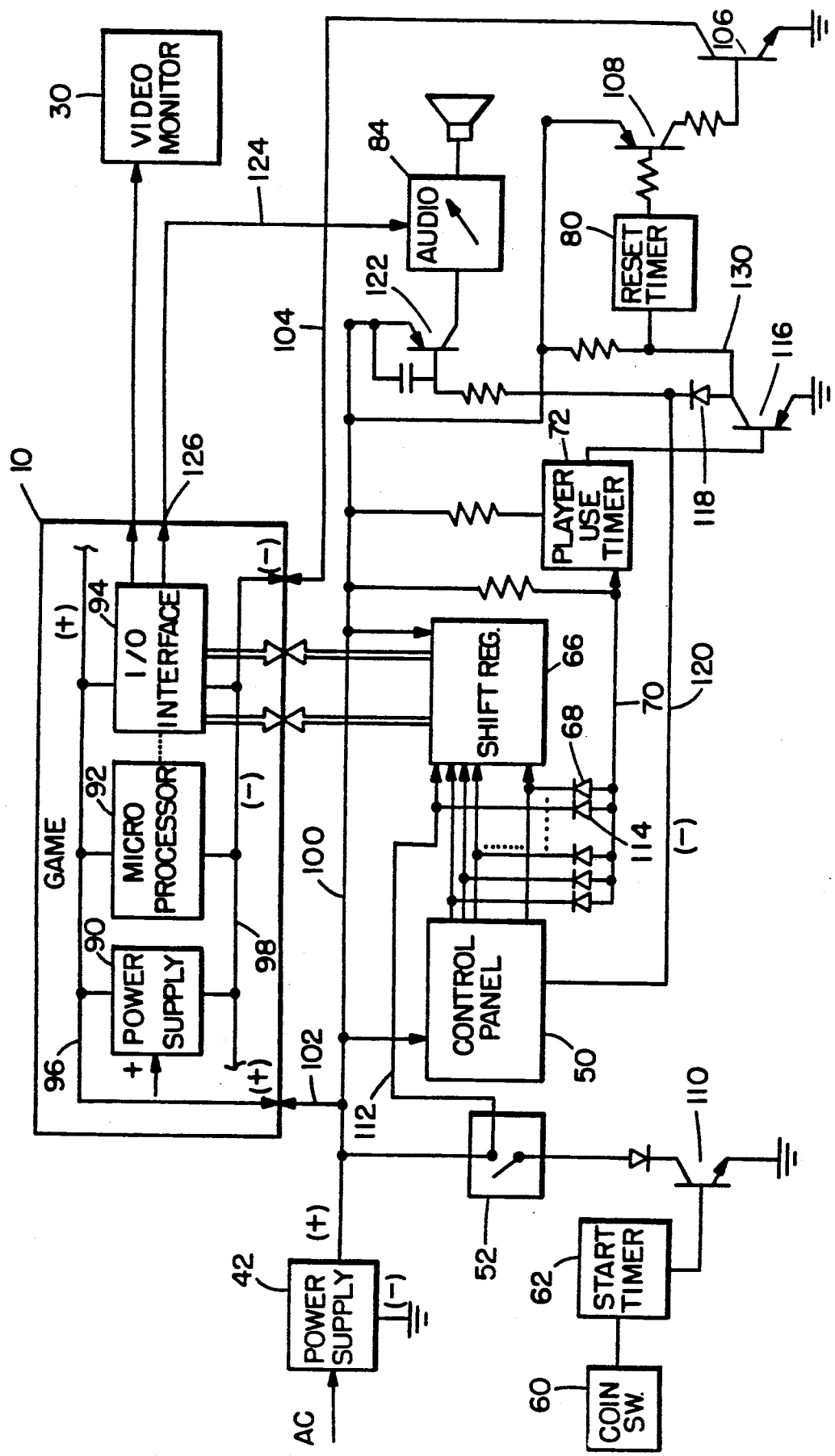
FIG. 4 is a diagram which includes many circuit details of the invention.

Referring now to FIG. 4, additional details of the circuit of FIG. 3 will be described to enable a fuller understanding of the invention. Referring first to base unit 10, the home use version thereof is provided with an internal, regulated power supply 90, a microprocessor 92, an input/output interface 94 and other internal circuits. As base unit 10 is meant for home use, internal power supply 90 receives an input from an external DC power supply, which is, in turn, connected to an AC line. Power supply 90 applies its voltage between a power bus 96 and a ground or return bus 98. Buses 96 and 98 are connected to both input/output ports and provide power to operate controllers 18 and 20 (shown in FIG. 1).

To modify base unit 10 to render it capable of coin-operation, its external AC power input is disconnected. In lieu thereof, an external power supply 42 is provided and applies a positive voltage to an external power bus 100. A connection from bus 100 to internal power bus 96 is made via line 102 (within a cable 34 and/or 35) to an existing signal port on base unit 10.

Reset control of base unit 10, to cause it to revert from a Play mode to an Attract mode, is accomplished by connecting internal ground bus 98 to external conductor 104 (within a cable 34 or 35). Conductor 104 connects to the collector of NPN transistor 106. Under normal circumstances, transistor 106 is maintained in a conductive state, except when reset timer 80 provides its output signal to transistor 108. At such time, transistor 106 is rendered non-conductive and interrupts the power to base unit 10 by opening the return circuit to internal ground bus 98.

In operation, coin switch 60 causes start timer 62 to commence timing out. During this time, an output from timer 62 is applied to the base of NPN transistor 110, causing it to conduct and apply a ground to start switch 52. When a player depresses start switch 52, the level on line 112 falls, which level fall is applied to shift register 66 and thence to base unit 10 to cause the game (which is presently in the Attract mode) to revert to the Play mode. The signal level fall on line 112 is sensed by diode 114 which, in turn, via line 70, causes player use timer 72 to start timing out. During time-out, player use timer 72 applies a negative level to the base of PNP transistor 116, causing it to conduct and complete a connection to ground for diode 118 and conductor 120. Within control panel 50, conductor 120 is connected to a ground bus (not shown) that provides a voltage return for all controls thereon, except for start switch 52. Thus, player use timer 72 enables (via a ground applied to line 120), all of the control elements on control panel 50 and thereby enables normal play of base unit 10.

The conduction of transistor 116 further enables, via the conduction of PNP transistor 122, operation of variable audio unit 84. Normal audio is fed to audio unit 84 via conductor 124, which is connected to an available input/output port 126 on base unit 10. Audio unit 84 includes a volume control for variable control of the audio portions of a game.

When a player is either finished with the game or ceases playing it, player use timer 72 will "time-out" due to no further reset signals being received on line 70. At such time, the output from player use timer 72 traverses to a high level and renders transistor 116 non-conductive. This action interrupts the ground connection to control panel 50; causes audio unit 84 to cease functioning (via the non-conduction of the transistor 122) and causes a positive level to be applied to reset timer 80 via line 130. As a result, reset timer 80 commences its short time-out period and, during that period applies a positive level to the base of transistor 108, causing it to become non-conductive. Transistor 106 is, in turn, rendered non-conductive and interrupts the ground connection to internal ground bus 98 within base unit 10. As a result, microprocessor 92 senses a power interruption and, upon power being restored, causes the game to revert to the Attract mode.

When reset timer 80 times-out, transistor 108 again becomes conductive, as does transistor 106, thereby applying ground back to internal ground bus 98 and readying base unit 10 for the next game.

It should be understood, that in lieu of interrupting the connection to internal ground bus 98, power supply 90 could be utilized to control the internal actions of base unit 10 and an additional switch applied to its input to interrupt power to base unit 10 during reset.

It is to be further noted that the control of start button 52 is controlled independently from the remaining user-operated elements on control panel 50. This is due to the fact that with some game cartridges, when "game over" is reached, it is possible to continue further into the game, rather than being required to start over. Thus, a game may automatically ask the player if he/she would like to continue to play, and if so, the screen instructs the player to push the start button again. However, by controlling the system as shown in FIG. 4, by the time the player gets to "game over", the start button is no longer enabled, as start timer 62 has timed-out. Thus, when a "continue to play question" is posed to the player, he/she can only continue play by inserting another coin and causing start timer 62 to recommence its time-out cycle.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A conversion system for adapting a home-play electronic game to coin-operated play, said electronic game having an access port for communicating with a remote controller, said access port including a DC level connection and signal line connections, said game further exhibiting both Attract and Play modes, said Attract mode being operative when power is initially applied to said game, said conversion system including a power supply and comprising:
   control means including a user operable start indicator for providing a signal to commence said Play mode, and user manipulated game control signalling means;
   a coin receipt indicator for signalling a coin deposit;
   timing means responsive to said coin deposit signal for enabling said start indicator for a determined time interval;
   register means for connecting signals from said start indicator and game control signalling means to said access port;
   player use timer means responsive to a player actuating a said game control signalling means for providing a use-time output; and
   reset means responsive to a termination of said use-time output for interrupting power to said game, to cause initiation of said attract mode.

2. The conversion system as recited in claim 1 wherein said conversion system power supply is connected as a power source for said game via said DC level connection in said access port.

3. The conversion system as recited in claim 1 wherein said player use timer means is responsive to user operation of said start indicator to commence said use-time output.

4. The conversion system as recited in claim 1 wherein said player use timer means is also responsive to user actuation of said start indicator to provide a use-time output, further comprising:
   control means responsive to said use-time output in response to actuation of said start indicator for enabling said game control signalling means.

5. The conversion system as recited in claim 4, wherein said timing means applies a ground connection to said start indicator during said determined time interval.

6. The conversion system as recited in claim 5, further comprising:
   a plurality of signal lines connecting said start indicator and game control signalling means to said register means; and
   means connecting each said signal line to said player use timer means, whereby each signal appearing on a said signal line causes a restart of said use-time output.

7. The conversion system as recited in claim 6, wherein said control means is a
   switch device connected between a common potential and said player use timer means, and responsive to said use-time output, for applying said common potential to said game control signalling means to thereby render it responsive to user actuation.

8. The conversion system as recited in claim 7, further comprising: second switch means connected between a common potential and a DC level connection in said access port, and responsive to a signal from said reset means for disconnecting and subsequently reconnecting said common potential to said access port, whereby said game is caused to exhibit said Attract mode upon said reconnection.

9. The conversion system as recited in claim 8, further comprising:
   audio means connected to said game and said switch means and enabled for operation when said switch means applies said common potential.

* * * * *